J. B. GAY.
MEANS FOR REPAIRING PNEUMATIC VEHICLE TIRES.
APPLICATION FILED MAR. 9, 1915.
1,161,044.
Patented Nov. 23, 1915.
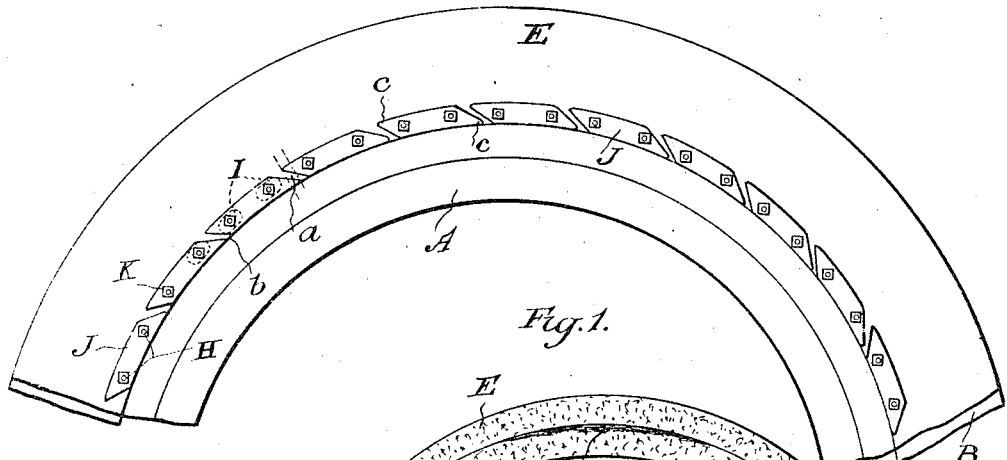
Fig. 1.
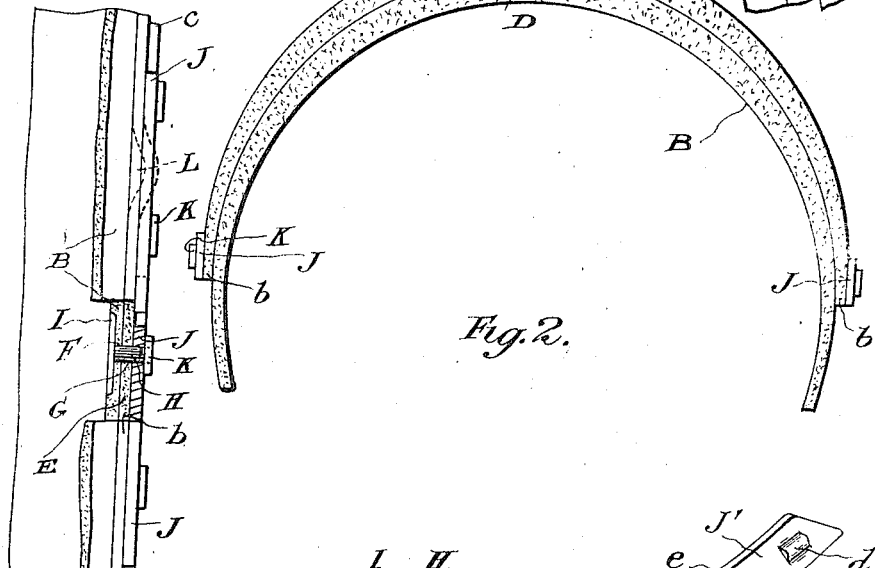
Fig. 2.
Fig. 3.
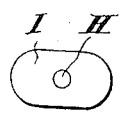
Fig. 4.
Fig. 5.
WITNESSES
O. M. Buckingham
F. P. Hammon
INVENTOR
James B. Gay
BY
Eugene R. Case
ATTORNEY

UNITED STATES PATENT OFFICE.

JAMES BULPIT GAY, OF TORONTO, ONTARIO, CANADA.

MEANS FOR REPAIRING PNEUMATIC VEHICLE-TIRES.

1,161,044. Specification of Letters Patent. Patented Nov. 23, 1915.

Application filed March 9, 1915. Serial No. 13,111.

*To all whom it may concern:*

Be it known that I, JAMES BULPIT GAY, a subject of the King of Great Britain, of the city of Toronto, county of York, Province of Ontario, Canada, have invented certain new and useful Improvements in Means for Repairing Pneumatic Vehicle-Tires, of which the following is a specification.

My invention relates to improvements in means for repairing pneumatic vehicle tires, and relates more particularly to the securing of a partly damaged outer casing having an unimpaired tread which I may term the tread member, over another outer casing which is in good condition except that the tread thereof is worn out, and the object of my invention is to secure said tread member over said outer casing in such a manner as to positively prevent any possibility of mud, sand, or water entering between said casing and tread member at the points where they are secured together.

A still further object of my invention is to construct the fastening means for the casing and tread member mentioned in such a manner that a continuous and substantially uninterrupted pressure zone will exist at each side of the tire at the edge where the tread member is secured to said outer casing so that these members may be intimately associated for the purpose specified, and yet allow for the full flexible movement of the tire.

The construction and operation of my invention will be hereinafter particularly set forth and what I claim as new will be pointed out in the claims forming part of this specification.

Figure 1 is a side elevation of portion of a pneumatic vehicle tire and portion of the rim therefor, showing my preferred form of clamping means for the tread member and outer casing. Fig. 2 is a cross section through the tread member and outer casing showing the position of the securing or fastening means therefor at each side of the tire. Fig. 3 is a detail view of portion of an outer casing, showing two sectional plates clamped in position, portion of one of said plates being shown in section to illustrate the means for clamping the same in position. Fig. 4 is an end view of one of the studs showing the preferred shape of head therefor, and Fig. 5 is a perspective view of an alternative form of sectional plate.

In the drawings, like characters of reference indicate corresponding parts in each figure.

It is well known that the outer casing of a pneumatic vehicle tire often becomes cut by the rim, with the result that this outer casing is oftentimes so badly damaged at the sides as to render it impossible for further use, notwithstanding the fact that the tread thereof may be sound. Now as any weakness in the outer casing oftentimes will result in the rupturing of the air tube, it is of great importance that this outer casing be sound at all points. It often happens that the tread of an outer casing becomes so worn as to render the casing incapable of further use without undergoing more or less expensive repairing, while the other portions of the casing are perfectly sound. In some places it is the practice to cut off the damaged sides of an otherwise sound outer casing and place the same over another outer casing otherwise sound except that the tread thereof is worn out, and secure these two outer casings together. Now my invention has particular reference to providing means for securing these two members just mentioned together for the purpose set forth.

A is a usual rim, and B the outer casing of any type of pneumatic tire, which outer casing can be readily removed from the rim A. For the purpose of this specification, it is supposed that the tread D of the casing B is so badly worn as to render this casing impossible of further use unless some protecting means be provided for this casing. Of course the tread of the casing B can be repaired by sending the casing to a suitable shop, but the cost of this repair is quite expensive, and as an automobile owner often has discarded outer casings with sound treads, it is much cheaper to make use of these discarded outer casings in renewing the tread D. Now E is one of these discarded outer casings, which I have termed the tread member. The sides of the tread member E, having been damaged more or less, are cut away, and then this outer member is placed over the outer casing B as shown particularly in Fig. 2. By any suitable means, holes F and G are formed in the casing B and the tread member E, at the sides thereof, and through these holes is passed a stud H provided with a head I. The required number of studs H are placed in position at both sides of the tire, as will be understood.

J are a plurality of sectional plates, made of any suitable material, preferably metal, and these plates co-act so as to form a sectional ring plate at each side of the tire. As illustrated in Figs. 1 and 3, a pair of studs H pass through each of the plates J, and one near each end thereof. Any suitable fastening means may be employed to clamp the plates J on the said studs. My preferred means for this purpose consists in screwing a nut K on the outer threaded end of each stud H. The pressure exerted by the fastening means for the stud will countersink the head I of each stud in the inner wall of the outer casing B, so that the said heads will not have undue frictional contact with the air tube (not shown).

Were the clamping means just described used alone, without the plates J, I have found from experience that because of the great pressure exerted by the air within the tire, in due course the sides of the tread member E and outer casing B would be buckled outwardly thus forming pockets L shown in dotted lines in Fig. 3 between each of the said studs. Now these pockets in due course will become filled with water, or sand, or mud which in due course would work its way between the tread member E and the outer casing B and very materially damage these members in the course of time, thus greatly shortening the life thereof. Of course the tendency of the tread member E and outer casing B to buckle outward and form the pockets L could be counteracted by using a large number of the fastening means described. But using an unduly large number of said fastening means would so greatly weaken the outer casing B as to render it practically useless. Therefore to prevent any danger of weakening the outer casing B when I secure the tread member E thereto, I use the plates J so that they will bridge the space separating the pair of studs H each plate is mounted on, and so make the pressure against the tread member E and outer casing B at the location where they are secured together co-extensive with the area of the inner side of each of the said plates. The bridging of the gap between the pairs of studs will absolutely prevent the formation of the pockets L already described. In order to bridge the space a separating each of the said plates J, the adjacent ends of the said plates overlap each other, as shown particularly in Fig. 1, and the result is that the zone of pressure between the edges b of the tread member E and the outer casing B is substantially continuous and unbroken, thus preventing at any point the formation of pockets L. The result is that the said tread member and outer casing will be so intimately associated at the places where they are secured together as to positively prevent the entry of dirt or water therebetween.

In the form of plates illustrated in Figs. 1 and 5 the ends c of each plate J are diagonally opposite and each extend beyond the body portion of the plate. This, or any equivalent construction, results in the advantages before set forth. In place of mounting one plate J on a pair of studs H, I may make a plate J' and form therewith, or secure thereto a lug d. The plate J' is of course provided with a hole e through which the fastening or riveting means must pass, and when this plate is clamped in position, the lug d will become embedded in the edges b of the tread member E, and thus hold the plate in proper position. The head I of each stud H is preferably shaped as shown in Fig. 4, and since this head will be positioned with its length lying substantially in the same direction as the plates J, it will be understood that the said heads will co-act with the said plates to effect one of the principal objects of this invention. The plurality of plates J at each side of the tire form a sectional ring plate which, so to speak, is flexible, and does not in any manner interfere with the function of the pneumatic tire. The holes f and g are preferably of smaller diameter than the studs H so as to insure tight fit of the studs.

While I have described what I consider to be the best embodiment of my invention, I desire it to be understood that the principles can be embodied in different forms, and I desire not to be limited beyond the requirements of the prior art and the terms of my claims.

What I claim as my invention is:

1. In a pneumatic vehicle tire, the combination with the outer casing and a tread member to be secured thereover, of a sectional ring plate, positioned at each side of the tire composed of a plurality of independent plates spaced apart, the end of adjacent plates overlapping each other so that a substantially continuous and unbroken zone of pressure will be applied at each side of the tire at the point where the tread member is secured to said outer casing, and means whereby said plates are clamped in place.

2. In a pneumatic vehicle tire, the combination with the outer casing and a tread member to be secured thereover, of a sectional ring plate, positioned at each side of the tire composed of a plurality of independent plates spaced apart, the ends of adjacent plates overlapping each other so that a substantially continuous and unbroken zone of pressure will be applied at each side of the tire at the point where the tread member is secured to said outer casing, means whereby each of said plates is clamped in place, comprising a stud provided at its inner end with a head, said stud extending through said tread member and said outer casing and through its associated plate, and means carried by the outer end of said stud for securing same in place.

3. In a pneumatic vehicle tire, the combination with the outer casing and a tread member to be secured thereover, of a sectional ring plate, positioned at each side of the tire composed of a plurality of independent plates spaced apart, and each provided with a pair of transverse holes near each end of the body portion thereof, certain diagonally opposed corners of each of said plates extending beyond the body portion of each plate so that the ends of adjacent plates will overlap each other so that a substantially continuous and unbroken zone of pressure will be applied at each side of the tire at the point where the tread member is secured to said outer casing; headed studs passed through said outer casing and said tread member and through each of the holes formed in said plates, and a nut screwing on the outer threaded end of each of said studs, as set forth.

In testimony whereof I have affixed my signature in presence of two witnesses.

JAMES BULPIT GAY.

Witnesses:
EGERTON R. CASE,
O. M. BURKINSHAW.